US008750834B2

(12) United States Patent
Suga et al.

(10) Patent No.: US 8,750,834 B2
(45) Date of Patent: Jun. 10, 2014

(54) COMMUNICATION DEVICE AND COMMUNICATION MANAGEMENT SYSTEM

(75) Inventors: Masakazu Suga, Maebashi (JP); Norio Ookawara, Maebashi (JP)

(73) Assignee: Sanden Corporation, Isesaki-Shi, Gunma (JP)

( * ) Notice: Subject to any disclaimer, the term of this patent is extended or adjusted under 35 U.S.C. 154(b) by 881 days.

(21) Appl. No.: 11/951,432

(22) Filed: Dec. 6, 2007

(65) Prior Publication Data

US 2008/0137571 A1 Jun. 12, 2008

(30) Foreign Application Priority Data

Dec. 6, 2006 (JP) ................................. 2006-329411

(51) Int. Cl.
*H04L 12/58* (2006.01)

(52) U.S. Cl.
USPC .................. 455/412.1; 455/412.2; 455/456.5; 379/67.1; 379/88.2; 370/310

(58) Field of Classification Search
USPC ................. 370/310, 235, 319, 353, 341, 420; 455/428, 427, 12.1, 411, 430, 410, 455/412.1, 412.2, 465.5; 380/249, 247; 379/203.01, 67.1, 88.2; 705/65
See application file for complete search history.

(56) References Cited

U.S. PATENT DOCUMENTS

| 5,960,059 | A * | 9/1999 | Geck ........................... 379/10.01 |
| 5,995,729 | A * | 11/1999 | Hirosawa et al. ................. 703/1 |
| 6,243,580 | B1 * | 6/2001 | Garner ........................... 455/428 |
| 6,300,863 | B1 * | 10/2001 | Cotichini et al. ............... 340/5.8 |
| 6,366,217 | B1 * | 4/2002 | Cunningham et al. ... 340/870.31 |
| 7,212,806 | B2 * | 5/2007 | Karaoguz ...................... 455/411 |
| 2002/0108062 | A1 * | 8/2002 | Nakajima et al. ............. 713/201 |
| 2002/0136214 | A1 * | 9/2002 | Do et al. ........................ 370/392 |
| 2006/0100961 | A1 * | 5/2006 | Paterno et al. .................. 705/43 |
| 2007/0198432 | A1 * | 8/2007 | Pitroda et al. ................... 705/64 |

FOREIGN PATENT DOCUMENTS

JP 2003-051056 2/2003

* cited by examiner

*Primary Examiner* — Mahendra Patel
(74) *Attorney, Agent, or Firm* — Banner & Witcoff, Ltd

(57) ABSTRACT

A communication device having a communication module as data circuit-terminating equipment connecting to a wireless packet communication network, and a controller interposed between the communication module and a data terminal equipment. The controller controls communication performed by the data terminal equipment using the communication module. The controller extracts, from a communication message sent from the data terminal equipment to a first management server, identification information of the data terminal equipment, stores the extracted identification information in a storage, and transmits the extracted identification information to a second management server by using the communication module when communication is not performed between the data terminal equipment and the first management server.

10 Claims, 4 Drawing Sheets

EXAMPLE OF MANAGEMENT DATA
IN COMMUNICATION DEVICE MANAGEMENT SERVER

| COMMUNICATION DEVICE INFORMATION | | | ELECTRONIC MONEY TERMINAL INFORMATION | |
|---|---|---|---|---|
| TEL. No. | IP ADDRESS | POSITION INFORMATION | TERMINAL ID | FINAL COMMUNICATION DATE/TIME |
| 080XXXXYYYY | 192.168.0.1 | N36.20,E139.00 | 01234 | 2006/11/15 08:25 |

COMMUNICATION DEVICE AND COMMUNICATION MANAGEMENT SYSTEM

BACKGROUND OF THE INVENTION

1. Field of the Invention

The present invention relates to a communication device for use in the field of telemetering including collection of information on selling with vending machines, in the field of telematics including distribution of traffic information to mobile units, and in other fields.

2. Description of the Related Art

In recent years, telemetering and telematics including collection/distribution of information via a wireless packet communication network have come into wide use. Telemetering was originally a generic name for systems for reading out measured values from measuring instruments by using a communication line. In recent years, however, it has been generally used as a term not only for data reading but also for operation monitoring and remote control of appliances. Typical examples of telemetering are a system for management of selling with vending machines, a system for management of the amount of use of gas or city water and a system for management in unmanned parking lots. See Japanese Patent Publication No. 2003-51056 about a conventional vending machine selling management system. Telematics means real-time provision of information service using a combination of a mobile unit such as a motor vehicle and a communication system. A Typical example of telematics is a vehicle information system for providing traffic information and navigation information in real time to a terminal provided on a motor vehicle.

In such a field, data circuit-terminating equipment (DCE) for connection to a wireless packet communication network in a remote place and data terminal equipment (DTE) using the data circuit-terminating equipment are disposed. For example, in a vending machine selling management system, a controller for performing selling control and control of the temperature in a chamber corresponds to data terminal equipment. The data terminal equipment connects to a predetermined network periodically or at arbitrary times via data circuit-terminating equipment to connect to a predetermined management computer via the network. The data terminal equipment connected to the management computer transmits various sorts of control object data.

In such a field, a management computer manages data terminal equipment. However, main items of data to be handled for management are data on various operations in appliances under management. In some cases, management of data terminal equipment is not adequately performed with respect to circumstances under which the data terminal equipment is installed. Even in a case where management involved with circumstances under which data terminal equipment is installed is performed in the management computer, it is difficult to accurately maintain management data on the circumstances. For example, a service worker or the like in a store where data terminal equipment is installed may change the placement of the data terminal equipment without permission or may replace the data terminal equipment with a spare one. In such a situation, there is a possibility of change information being not reflected in management data. In some cases, therefore, there is a possibility of data terminal equipment not being installed in a place designated by management data when a system manager goes to the designated place for a maintenance/operation purpose. This is a hindrance to maintenance and service.

BRIEF SUMMARY OF THE INVENTION

An object of the present invention is to provide a communication device and system suitable for grasping circumstances under which appliances are installed.

To achieve the above-described object, according to the present invention, there is provided a communication device including a communication module as a data circuit-terminating equipment connecting to a wireless packet communication network, and controller interposed between the communication module and data terminal equipment, the controller controlling communication performed by the data terminal equipment using the communication module. The controller extracts, from a communication message sent from the data terminal equipment to a first management server, identification information of the data terminal equipment, stores the extracted identification information into a storage, and transmits the extracted identification information to a second management server by using the communication module when communication is not performed between the data terminal equipment and the first management server.

According to the present invention, the information for identification of the data terminal equipment can be obtained in the second management server separately from acquisition of the identification information in the first management server with which the data terminal equipment communicates. Transmission of the identification information to the second management server is performed not by the data terminal equipment but by the controller in the communication device. That is, the second management server is enabled to obtain the information for identification of the data terminal equipment without making any modification or change in the data terminal equipment. In this way, management of the data terminal equipment specific to the second management server is enabled as well as management of the data terminal equipment specific to the first management server. In the second management server, therefore, management of the information for identification of the data terminal equipment, for example, in association with information for identification of the communication module is enabled. Thus, more flexible and effect management is made possible in comparison with the related art.

As a typical form of implementation of the present invention, a system in which the first management server performs centralized control of the data terminal equipment may be mentioned. Conventionally, such a system is constructed by connecting a communication module to data terminal equipment. According to the present invention, controller is interposed between the data terminal equipment and the communication module by assuming use in such a system. Also, the second management server performs centralized control of the communication device having the controller and the communication module. Further, the second management server manages the information for identification of the data terminal equipment together with management information about the communication device. The information for identification of the data terminal equipment may be identification information on an application layer of an OSI reference model.

In the present application, an arrangement is also proposed in which the controller obtains position information about an installation place by using a position information service offered in the wireless packet communication network, stores the position information in the storage together with the identification information, and transmits the position information to the second management server together with the identification information. Further, in the present application, an arrangement is proposed which is provided with position information obtaining means for obtaining position information about an installation place, and in which the controller obtains position information from the position information obtaining means, stores the position information in the storage together with the identification information, and transmits the position information to the second management server together with the identification information.

According to the present invention, the controller can obtain position information about the installation place and, therefore, management of information on the position of each of a plurality of data terminal equipment can be performed in the second management server.

Other objects, configurations and advantages of the invention will become apparent from the following detailed description of the invention.

DETAILED DESCRIPTION OF THE INVENTION

A communication management system according to an embodiment of the present invention will be described with reference to the drawings. The embodiment will be described with respect to a system in which centralized control is performed on electronic money terminals. An electronic money terminal is a device for performing settlement processing with an appliance such as a card or a portable telephone incorporating a non-contact IC chip functioning as an electronic purse. The overall configuration of the communication management system according to the present invention will be described with reference to the configuration diagram of FIG. 1.

Figure 1:
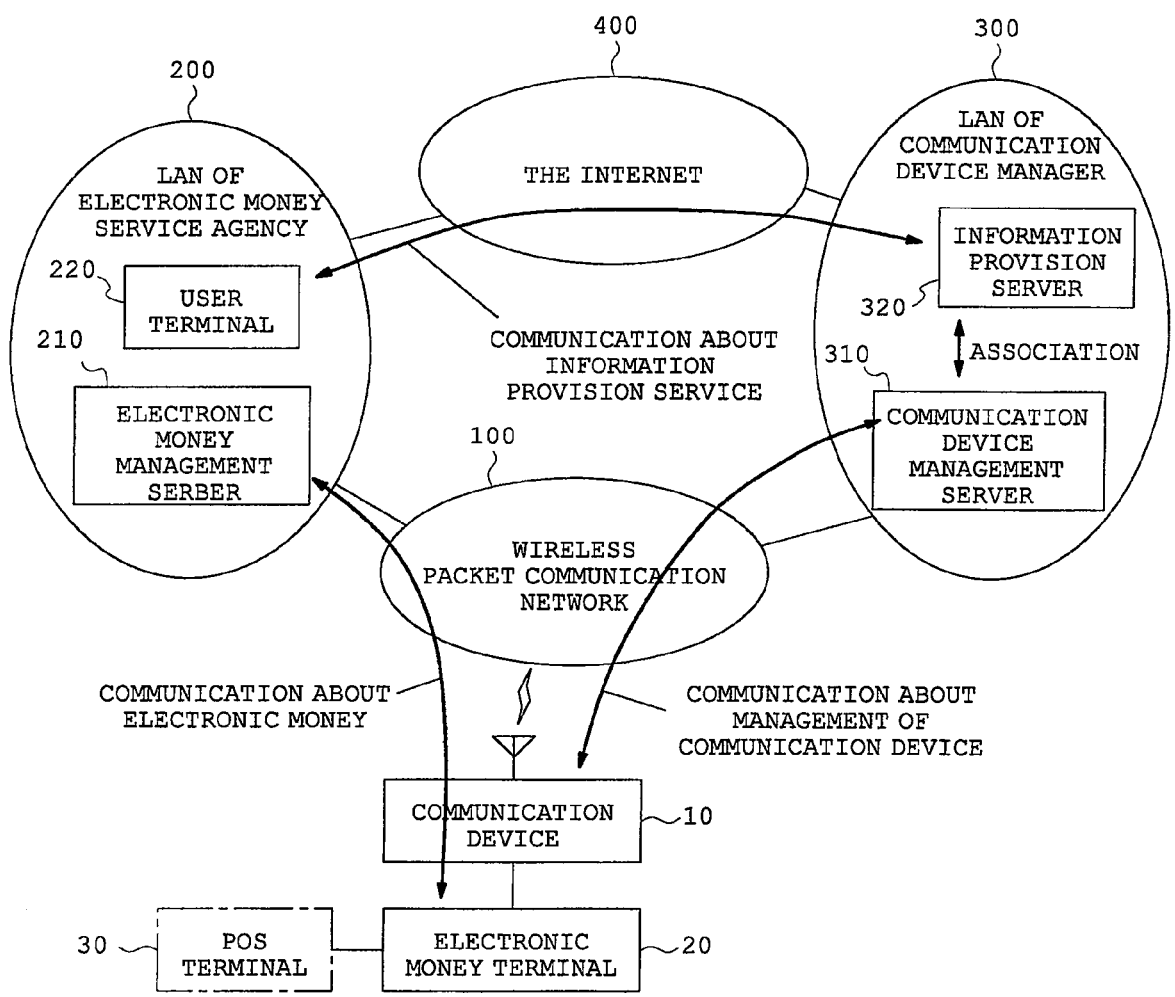
FIG. 1 is a diagram showing the configuration of a communication management system.

This management system is provided with a wireless packet communication network 100, a communication device 10 which can be connected to the wireless packet communication network 100, and an electronic money terminal 20 connected to the communication device 10 as shown in FIG. 1. The electronic money terminal 20 performs electronic money settlement in a single state or in a state of being connected to an external appliance such as a POS terminal 30. The electronic money terminal 20 connects to the wireless packet communication network 100 by using the communication device 10 and performs communication about electronic money management with an electronic money management server 210 provided in a LAN 200 of an electronic money service agency. The communication device 10 connects by itself to the wireless packet communication network 100 to perform communication about management of the communication device, etc., with a communication device management server 310 provided in a LAN 300 of a manager who manages the communication device 10. In the LAN 300 of the communication manager, an information provision server 320 for offering various information services to a user, e.g., the electronic money service agency is installed. The information provision server 320 provides information including information on the state of operation of the electronic money terminal 20, information on circumstances under which the electronic money terminal 20 is installed and information on the state of operation and attributes of the communication device 10 connecting to the electronic money terminal 20 via the Internet 400 or the like in corporation with the communication device management server 310. The electronic money service agency can obtain various sorts of management information by connecting to the information provision server 320 by using a user terminal 220 or the like in its own LAN 200. Connections are established between the networks by well-known intermediary devices (not shown).

To data circuit-terminating equipment (DCE) provided in the wireless packet communication network 100, telephone numbers are assigned in advance by a communication service agency. In the wireless packet communication network 100, a fixed IP address is given to data circuit-terminating equipment at the time of connection. Accordingly, the fixed IP address is associated with the telephone number. Association between the fixed IP address and the telephone number can be set by a user. Also, in the wireless packet communication network 100, a service for providing position information to data circuit-terminating equipment is carried out.

Figure 2:
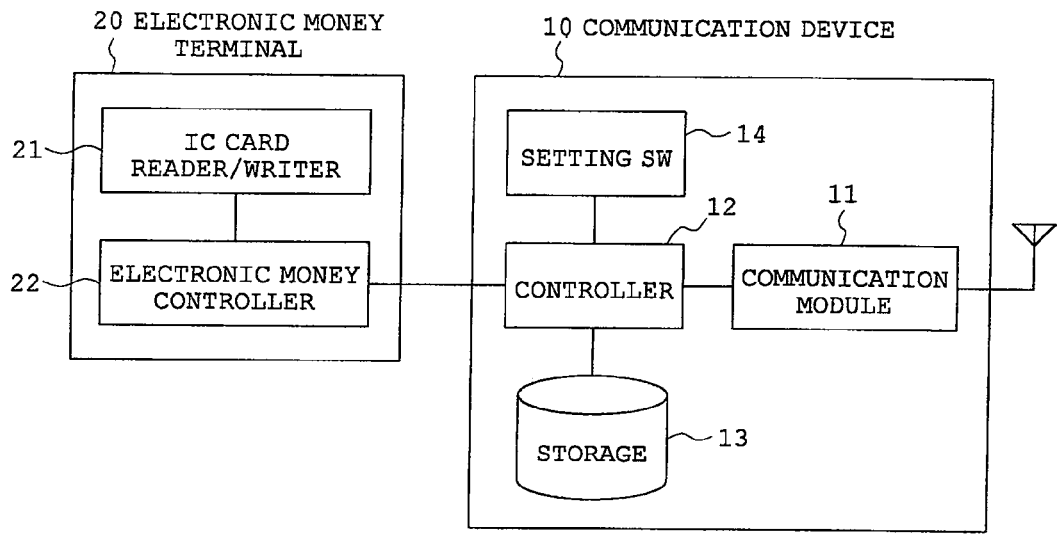
FIG. 2 is a diagram showing the configurations of an electronic money terminal and a communication device.

The configurations of the communication device 10 and the electronic money terminal 20 will be described with reference to the configuration diagram of FIG. 2. As shown in FIG. 2, the communication device 10 has a communication module 11 for connection to the wireless packet communication network 100, a controller 12 interposed between the communication module 11 and the electronic money terminal 20, a storage device 13 which stores various sorts of information, and a setting switch 14 for changing the operation of the controller 12.

When the electronic money terminal 20 performs communication using the communication module 11, the controller 12 performs not only control of translation for the communication but also communication message conversion processing and connection processing as required. For example, if the electronic money terminal 20 is incompatible with a protocol or a service in the wireless packet communication network 100, the controller 12 performs processing such as to solve incompatibility between the service and the electronic money terminal 20, e.g., authentication processing as proxy for the electronic money terminal 20, or address conversion processing, thus making it possible to adopt any of various network services without requiring any modification or change in the electronic money terminal 20. In communication by the electronic money terminal 20, the electronic money terminal 20 corresponds to data terminal equipment, while the entire communication device 10 corresponds to data circuit-terminating equipment.

During communication by the electronic money terminal 20 using the communication module 11, the controller 12 extracts, from an communication message, a terminal ID which is identification information for uniquely identifying the electronic money terminal 20 and date/time information, and stores the terminal ID and the date/time information in the storage device 13. A method of extracting a terminal ID and date/time information will be described later in detail. Also, the controller 12 obtains position information from the wireless packet communication network 100 by using the communication module 11 and stores the position information in the storage device 13. Further, when the controller 12 receives an information obtaining request from the communication device management server 310 during there is no communication by the electronic money terminal 20, it performs processing for reply to the request. More specifically, the controller 12 transmits the terminal ID, date/time information and position information stored in the storage device 13 to the communication device management server 310. Information extraction/storage/transmission processing such as described above is executed only when the setting switch 14 is on. In communication between the communication device 10 and the communication device management server 310, the controller 12 corresponds to data terminal equipment, while the communication module 11 corresponds to data circuit-terminating equipment.

The electronic money terminal 20 has, as shown in FIG. 2, an IC card reader/writer 21 which writes data to or reads data from an IC card in a non-contact manner, and an electronic money controller 22 for performing electronic money settlement with an IC card by using the IC card reader/writer 21. Settlement money amount input means are roughly divided into two kinds: an input device such as a ten-key cluster provided on the electronic money terminal 20, and an external device such as POS terminal 30 connected to the electronic money terminal 20.

The electronic money controller 22 accumulates settlement data in a predetermined storage device (not shown) and sends accumulated settlement data to the electronic money management server 210 periodically (for example, once a week). In communication between the electronic money controller 22 and the electronic money management server 210, TCP/IP is used as means for forming a communication path. Also, in a layer corresponding to an application layer in an OSI reference model, a specific communication protocol (hereinafter referred to as "electronic money protocol") is used.

Figure 3:
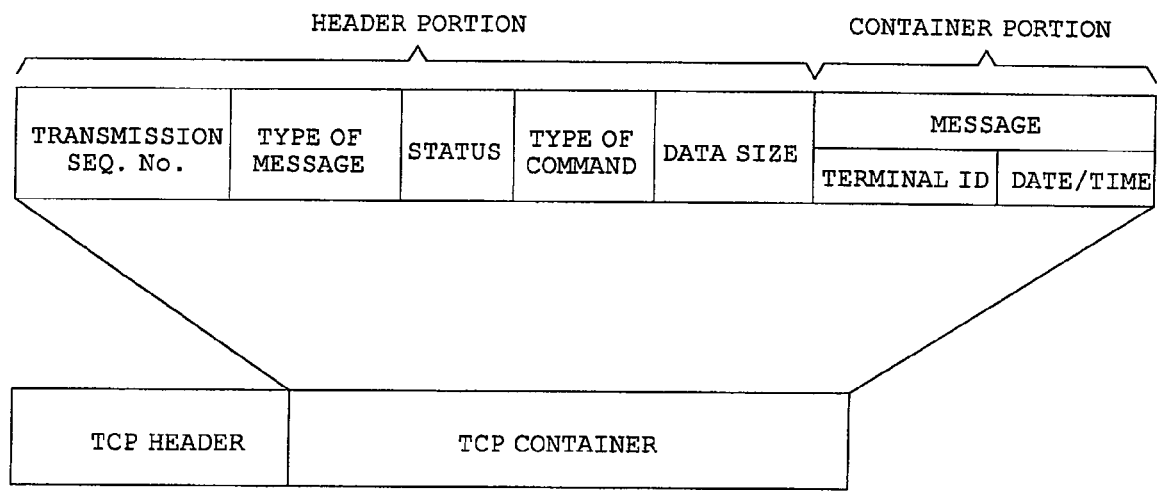
FIG. 3 is a diagram showing the structure of a packet in accordance with an electronic money protocol.

The structure of a packet (frame) in the electronic money protocol will be described with reference to FIG. 3. As shown in FIG. 3, a header portion of the packet contains a communication serial number, a type of communication message, a status, a kind of instruction, and a data size. In an initial authentication stage of communication, a container portion contains the terminal ID of the electronic money terminal 20 and information on the date and time of communication. In a sequence after the authentication, the container portion contains encrypted settlement information.

Figures 4, 5:
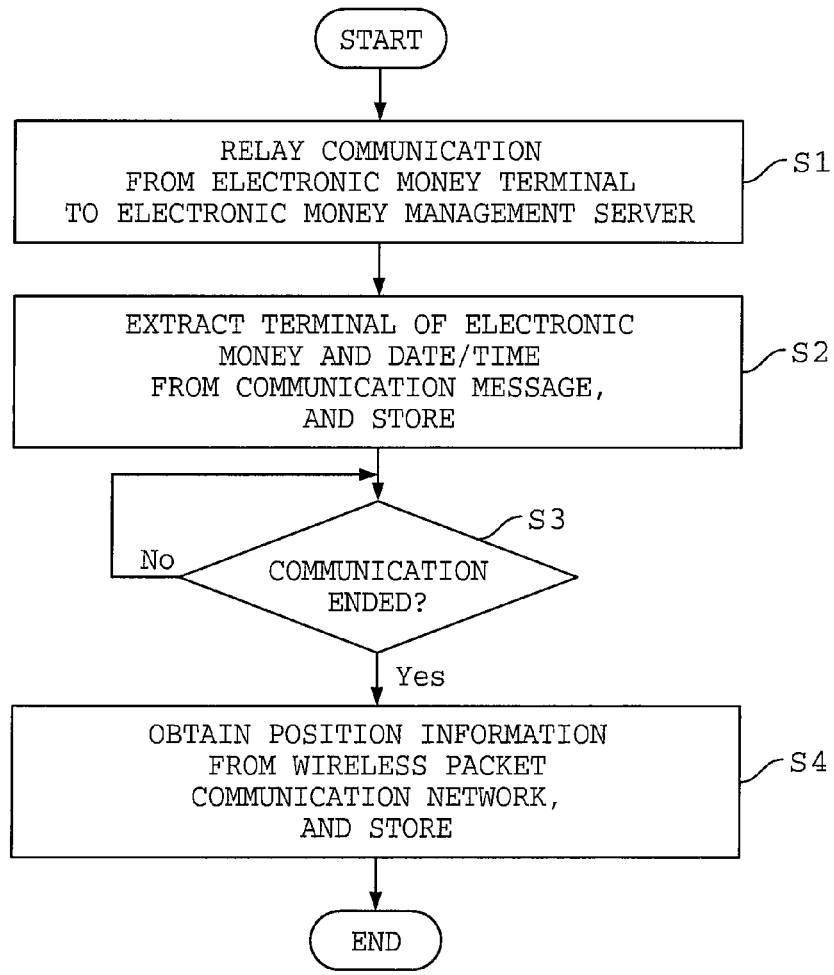
FIG. 4 is an example of management data in a communication device management server.
FIG. 5 is a flowchart for explaining the operation of the communication device.

The communication device management server 310 manages communication device 10 and the electronic money terminal 20 by associating them each other. FIG. 4 shows an example of management data in the communication device management server 310. As shown in FIG. 4, management data contains a telephone number, an IP address and position information as management information of the device 10 and contains a terminal ID and a final communication date/time as management information of electronic money terminal 20. Position information of the communication device 10, the terminal ID of the electronic money terminal 20 and a final communication date/time in the management data are collected from each of a plurality of communication devices 10. This information collection is executed in response to an information obtaining request from the information provision server 320 or to an input from a console or the like.

The information provision server 320 provides a user (the electronic money service agency in the present embodiment) with management data under management of the communication device management server 310. More specifically, management data in the communication device management server 310 is processed from various viewpoints to be provided in Web service form to the user terminal 220. When the information provision server 320 receives an information obtaining request from the user terminal 220, it relays the information obtaining request to the communication device management server 310.

The operation of the communication device 10 according to the present embodiment will be described with reference to a flowchart in FIG. 5. When the controller 12 in the communication device 10 receives a request for communication with the electronic money management server 210 from the electronic money terminal 20, it relays the communication request to the communication module 11. Also, the controller 12 relays and controls subsequent communication between the electronic money terminal 20 and the electronic money management server 210 (step S1). In communication between the electronic money terminal 20 and the electronic money management server 210, the controller 12 extracts the terminal ID and date/time information from a packet in accordance with the electronic money protocol and stores the terminal ID and date/time information in the storage device 13. More specifically, the controller 12 determines whether or not the packet in accordance with the electronic money protocol is in the authentication stage. If the packet is in the authentication stage, the controller 12 extracts the terminal ID and date/time information contained in the container portion. Determination as to whether or not the packet is in the authentication stage may be made according to whether or not each information item in the header portion is a predetermined pattern. Subsequently, when the controller 12 of the communication device 10 detects the completion of communication between the electronic money terminal 20 and the electronic money management server 210 (step S3), it obtains position information from the wireless packet communication network 100 and stores the position information in the storage device 13 (step S4). By the above-described processing, the terminal ID, date/time information and position information about the electronic money terminal 20 with respect to the latest communication before are stored in the storage device 13.

Figure 6:
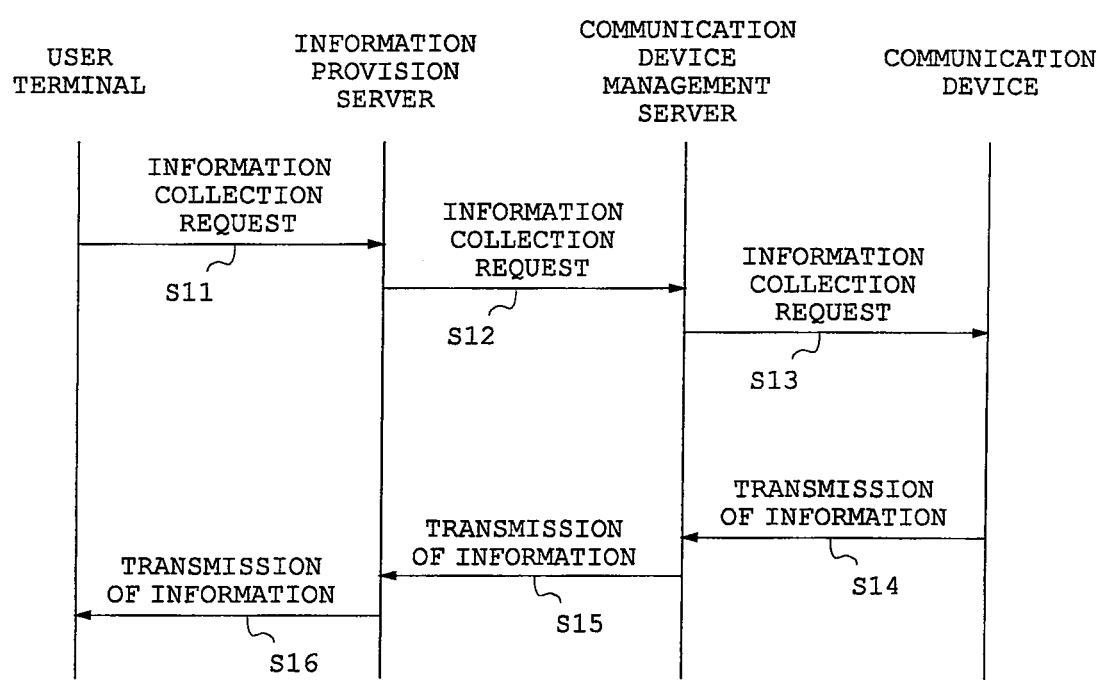
FIG. 6 is a sequence chart for explaining information provision service.

Description will next be made of the information provision service according to the present embodiment with reference to the sequence chart in FIG. 6. The electronic money service agency accesses the information provision server 320 by using the user terminal 220. When the user terminal 220 transmits an information obtaining request designating the electronic money terminal 20 or the communication device 10 (step S11), the information provision server 320 relays the request to the communication device management server 310 (step S12). The communication device management server 310 transmits the information obtaining request to the communication device 10 which is to reply to the request (step S13). Receiving the request, the communication device 10 transmits to the communication device management server 310 the terminal ID, date/time information and position information stored in the storage device 13 (step S14). The communication device management server 310 stores as management data the information received from the communication device 10 and provides this management data to the information provision server 320 (step S15). The information provision server 320 provides as Web service the management data obtained from the communication device management server 310 to the user terminal 220 (step S16). By the above-described processing, the latest circumstance data on the electronic money terminal 20 and the communication device 10 to the user terminal 220.

Thus, in the communication management system according to the present embodiment, management information about each communication device 10 and information such as a terminal ID about the electronic money terminal 20 connected to the communication device 10 are managed in a state of being associated with each other in the communication device management server 310 separate from the electronic money management server 210. This management is useful in tracing and grasping the circumstances under which the electronic money terminal 20 is installed. In particular, according to the present embodiment, position information about the communication device 10 is obtained and managed. Therefore the circumstances under which the electronic money terminal 20 is installed can be easily traced and grasped. Also, according to the present embodiment, the above-described effect can be obtained without modifying or changing the electronic money management server 210 and electronic money terminal 20. Therefore it is preferable on the viewpoint of the system construction cost.

While the present invention has been described in detail with respect to an embodiment thereof, the present invention is not limited to the described embodiment. For example, while in the above-described embodiment the communication device 10 obtains position information by utilizing the position information provision service offered in the wireless packet communication network 100, position information may be obtained by a different method. For example, a method of using a communication module 11 with a GPS function, a method of incorporating a separate GPS device and other methods are conceivable.

While in the above-described embodiment position information is obtained each time communication by electronic money terminal 20 completes, position information may be obtained by suitable timing not in synchronization with the end of communication. For example, a method of obtaining at a fixed time, e.g., one time in a day, a method of obtaining position information upon receiving an information obtaining request from the communication device management server 310 and other methods are conceivable.

While the embodiment has been described with respect to an electronic money terminal management system as an example of the communication management system, the present invention can also be applied to other telemetering and telematics systems.

The invention claimed is:

1. A communication device comprising a communication module, as data circuit-terminating equipment, for connecting to a wireless packet communication network, and a controller being interposed between the communication module and data terminal equipment, the controller configured for controlling communication performed by the data terminal equipment through the communication module to the wireless communication packet network, wherein:
the controller being configured to extract, from a communication message sent from the data terminal equipment to a first management server, identification information of the data terminal equipment, store the extracted identification information into a storage, and transmit the extracted identification information to a second management server via the communication module during when communication by said data terminal equipment is not performed between the data terminal equipment and the first management server, wherein the controller obtains position information about an installation place by using a position information service offered in the wireless packet communication network, stores the position information into the storage together with the identification information, and transmits the position information to the second management server together with the identification information.

2. The communication device according to claim 1, further comprising position information obtaining means for obtaining position information about an installation place,
wherein the controller obtains position information from the position information obtaining means, stores the position information into the storage together with the identification information, and transmits the position information to the second management server together with the identification information.

3. The communication device according to claim 1 wherein the identification information comprises information for identification of the data terminal equipment in communication between the data terminal equipment and the first management server, and the communication corresponds to an application layer of an OSI reference model.

4. A communication management system comprising:
a communication device including a communication module as data circuit-terminating equipment connecting to a wireless packet communication network, and a controller configured for controlling data communication through the communication module to the wireless packet communication network;
data terminal equipment which performs communication to the wireless packet communication network with the communication device;
a first management server which performs centralized control of the data terminal equipment; and
a second management server which performs centralized control of the communication device,
wherein the controller extracts, from a communication message sent from the data terminal equipment to the first management server, identification information of the data terminal equipment, stores the extracted identification information into a storage, and transmits the extracted identification information to the second management server by using the communication module when communication is not performed between the data terminal equipment and the first management server, and
wherein the second management server stores, into a storage, identification information of the communication device and the identification information of the data terminal equipment received from the communication device relationally;
wherein the controller obtains position information about an installation place by using a position information service offered in the wireless packet communication network, stores the position information into the storage together with the identification information, and transmits the position information to the second management server together with the identification information.

5. The communication device according to claim 1, wherein the position information is associated with Global Position Service information.

6. The communication device according to claim 1, wherein the identification information of the communication device and the identification information of the data terminal equipment received from the communication device and the position information is processed by the second management server for centralized control of the communication device.

7. The communication system according to claim 4, wherein the identification information comprises information for identification of the data terminal equipment in communication between the data terminal equipment and the first management server, and the communication corresponds to an application layer of an OSI reference model.

8. The communication management system according to claim 4, wherein the identification information of the communication device and the identification information of the data terminal equipment received from the communication device and the position information is processed by the second management server for control of the communications device.

9. A method comprising:
providing a communication device including a communication module as data circuit-terminating equipment connecting to a wireless packet communication network, and a controller configured for controlling data communication through the communication module to the wireless packet communication network;
providing a data terminal equipment which performs communication to the wireless packet communication network with the communication device;
providing a first management server which performs centralized control of the data terminal equipment; and
providing a second management server which performs centralized control of the communication device,
wherein the controller extracts, from a communication message sent from the data terminal equipment to the first management server, identification information of the data terminal equipment, stores the extracted identification information into a storage, and transmits the extracted identification information to the second management server by using the communication module when communication is not performed between the data terminal equipment and the first management server, and
wherein the second management server stores, into a storage, identification information of the communication device and the identification information of the data terminal equipment received from the communication device relationally;
wherein the controller obtains position information about an installation place by using a position information service offered in the wireless packet communication network, stores the position information into the storage together with the identification information, and transmits the position information to the second management server together with the identification information.

10. The method according to claim 9, wherein the controller extracts said identification information of the data terminal equipment responsive to a request.

* * * * *